United States Patent
Middleton et al.

(10) Patent No.: US 6,908,549 B2
(45) Date of Patent: Jun. 21, 2005

(54) REUSABLE STORM WATER SAMPLER AND POLLUTANT FILTER INSERT

(75) Inventors: Richard G. Middleton, Columbia, SC (US); Marion H. Lessene, III, Isle of Palms, SC (US)

(73) Assignee: Waterpollutionsolutions.com, Inc., Columbia, SC (US)

( * ) Notice: Subject to any disclaimer, the term of this patent is extended or adjusted under 35 U.S.C. 154(b) by 0 days.

(21) Appl. No.: 10/860,442

(22) Filed: Jun. 3, 2004

(65) Prior Publication Data

US 2005/0000872 A1 Jan. 6, 2005

Related U.S. Application Data

(62) Division of application No. 10/100,880, filed on Mar. 19, 2002, now Pat. No. 6,767,456.
(60) Provisional application No. 60/277,111, filed on Mar. 19, 2001.

(51) Int. Cl.[7] .................................................. E03F 5/06
(52) U.S. Cl. ...................... 210/164; 210/232; 210/266; 210/282; 404/4
(58) Field of Search .............................. 210/163, 164, 210/266, 282, 924, 232; 404/4, 5

(56) References Cited

U.S. PATENT DOCUMENTS

| | | | |
|---|---|---|---|
| 5,019,254 A | * | 5/1991 | Abrevaya et al. ........... 210/282 |
| 5,028,320 A | | 7/1991 | Gaudin et al. |
| 5,062,735 A | | 11/1991 | Gaudin |
| 5,468,536 A | | 11/1995 | Whitcomb et al. |
| 5,575,925 A | | 11/1996 | Logue, Jr. |
| 5,744,048 A | | 4/1998 | Stetler |
| 5,820,762 A | * | 10/1998 | Bamer et al. ............... 210/163 |
| 5,849,198 A | | 12/1998 | Sharpless |
| 5,954,952 A | * | 9/1999 | Strawser, Sr. ............... 210/164 |
| 6,080,307 A | | 6/2000 | Morris et al. |
| 6,086,758 A | * | 7/2000 | Schilling et al. ............ 210/164 |
| 6,099,723 A | | 8/2000 | Morris et al. |
| 6,132,603 A | | 10/2000 | Mokrzycki et al. |
| 6,200,484 B1 | | 3/2001 | McInnis |
| 6,270,662 B1 | | 8/2001 | Gibson et al. |
| 6,368,499 B1 | | 4/2002 | Sharpless |
| 6,517,709 B1 | | 2/2003 | Cardwell et al. |
| 6,531,059 B1 | | 3/2003 | Morris et al. |
| 6,551,023 B2 | | 4/2003 | Allard |

* cited by examiner

*Primary Examiner*—Christopher Upton
(74) *Attorney, Agent, or Firm*—Sara A. Centioni; Michael A. Mann; Nexsen Pruet, LLC

(57) ABSTRACT

An insert for use in a sewer system to remove oils and solvents carried by surface water runoff. The insert includes a holder and a quantity of water permeable, hydrophobic, oil and solvent absorbing material such as melt blown polypropylene. The holder has two functions. It holds an effective quantity of the absorber and holds it in such a way that the surface water is exposed to the absorber to allow oils and solvents to be absorbed. The insert in preferably placed, cartridge-like, at the inlet or outlet of the sewer system so that it may be quickly checked, replaced and serviced. In one embodiment, the insert also contains a leaf trap.

5 Claims, 7 Drawing Sheets

REUSABLE STORM WATER SAMPLER AND POLLUTANT FILTER INSERT

CROSS REFERENCE TO RELATED PATENTS

The present application is a divisional application of U.S. patent application Ser. No. 10/100,880 filed Mar. 19, 2002, now U.S. Pat. No. 6,767,456, which claimed the priority of the provisional application Ser. No. 60/277,111 that was filed Mar. 19, 2001.

STATEMENT REGARDING FEDERALLY SPONSORED RESEARCH OR DEVELOPMENT

Not applicable.

REFERENCE TO A SEQUENCE LISTING, A TABLE, OR A COMPUTER PROGRAM LISTING COMPACT DISK APPENDIX

Not Applicable.

BACKGROUND OF THE INVENTION

The present invention relates to managing surface water generally and to pollution control and recycling more specifically.

Sometimes when it rains, it pours. When it pours, leaves, dirt, debris, oils and solvents on the surfaces of roads and streets are swept by surface water runoff toward municipal sewer systems where this material may be collected and processed. Unfortunately, this material often flows directly into lakes or rivers. The surface water may enter the sewer system at inlets along a street curb or catch basin and exit the sewer system through large pipes. Oils and chemicals in the run off will contaminate the bodies of water into which they are dumped. This is referred to as "nonpoint source pollution" by some regulating authorities. A nonpoint source of pollution is basically pollution without a single point of origin, or pollution that is not introduced into a receiving body of water from a specific outlet. Some other examples of nonpoint sources may include agriculture, forestry, mining, construction, and land disposal. Because this type of pollution has no particular point of origin, it is not only difficult to collect this pollution, but is also difficult to monitor and prevent the pollution.

Thus, there remains a need for a better way to manage the collection of the materials swept into the sewer system.

SUMMARY OF THE INVENTION

According to its major aspects and briefly recited, the present invention is an insert to be placed into an inlet or outlet of a municipal sewer system. The insert comprises a holder such as a mesh bag or pillow and a water permeable, hydrophobic oil and solvent absorber carried by the holder. The holder will both hold a sufficient quantity of the absorber to be effective in absorbing oils and solvents for a suitable period of time but also to hold it in such a way as to expose it to the in-rushing or out-rushing surface water so that the absorber is exposed to the oil- and solvent-bearing surface water in order to extract at least a portion of the solvents and oils. In addition, the device may also include a trap for large particulate such as leaves and twigs.

An important feature of the present invention is the use of a hydrophobic, water-permeable absorber. The absorber absorbs oils and solvents but not water, and it allows water to pass through readily. The absorber, moreover, can be cleaned and reused, and the solvent and oil recovered. Furthermore, the absorber can be tested for the presence of various chemicals that are absorbed as the water passes through it. This testing capability provides a convenient way to identify the chemical concentrations and flow rates for in-rushing and out-rushing surface water.

Another important feature of the present invention is the holder. The holder, as noted above, serves two functions: it not only holds an effective quantity of the absorber, but it holds the absorber so that it is exposed to the in-rushing or out-rushing surface water so that the oils and solvents in the water can be absorbed. With the absorber in the holder, the insert becomes a convenient, replaceable, and recyclable cartridge for insertion into the inlet or outlet of the sewer system to absorb oils and solvents but readily pass the surface water.

Still another feature of the invention is its placement. By being placed at the inlet or outlet of the sewer system, it is easily installed and removed, readily checked, and more accessible for servicing and maintenance than if placed further into the interior to the sewer system.

These and other features and their advantages will be clear to those skilled in the art of surface water management from a careful reading of the Detailed Description of Preferred Embodiments, accompanied by the following drawings.

BRIEF DESCRIPTION OF THE DRAWINGS

In the figures.

DETAILED DESCRIPTION OF PREFERRED EMBODIMENTS

The present invention is an insert for use in the inlets or outlets of municipal sewer systems. A municipal sewer system is a network of pipes and conduits that is designed to receive surface water and convey the same to a reservoir, river, or processing station. The inlets to the municipal sewer are typically manholes in streets, and grated drains along curbs and gutters. The outlets are usually large pipes that direct surface water into a body of water such as a lake, a river, or a reservoir.

Figure 1A:
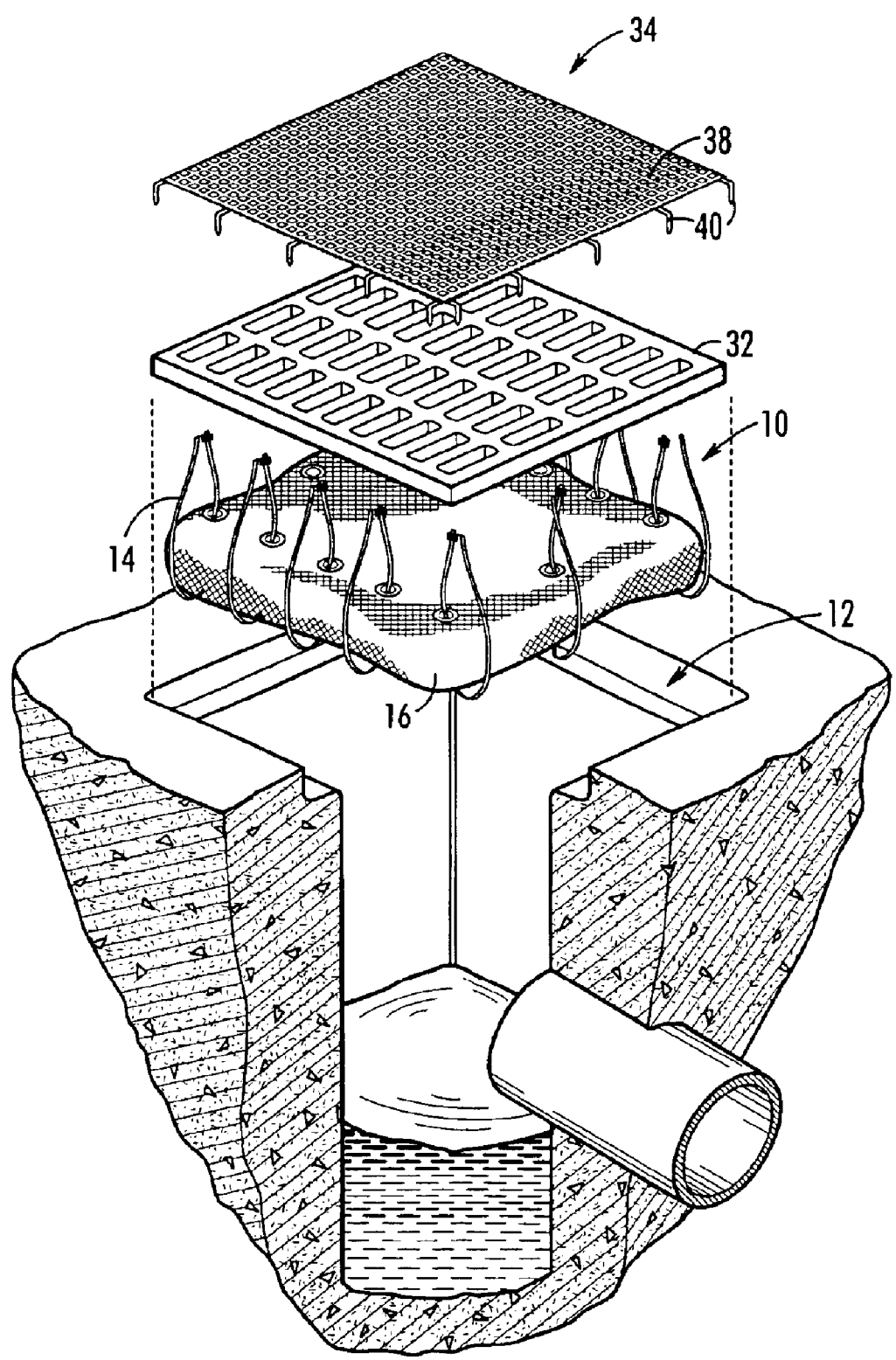
FIG. 1A is an exploded cut-away perspective view of a grated drain with an insert according to a preferred embodiment of the present invention.
Figure 1B:
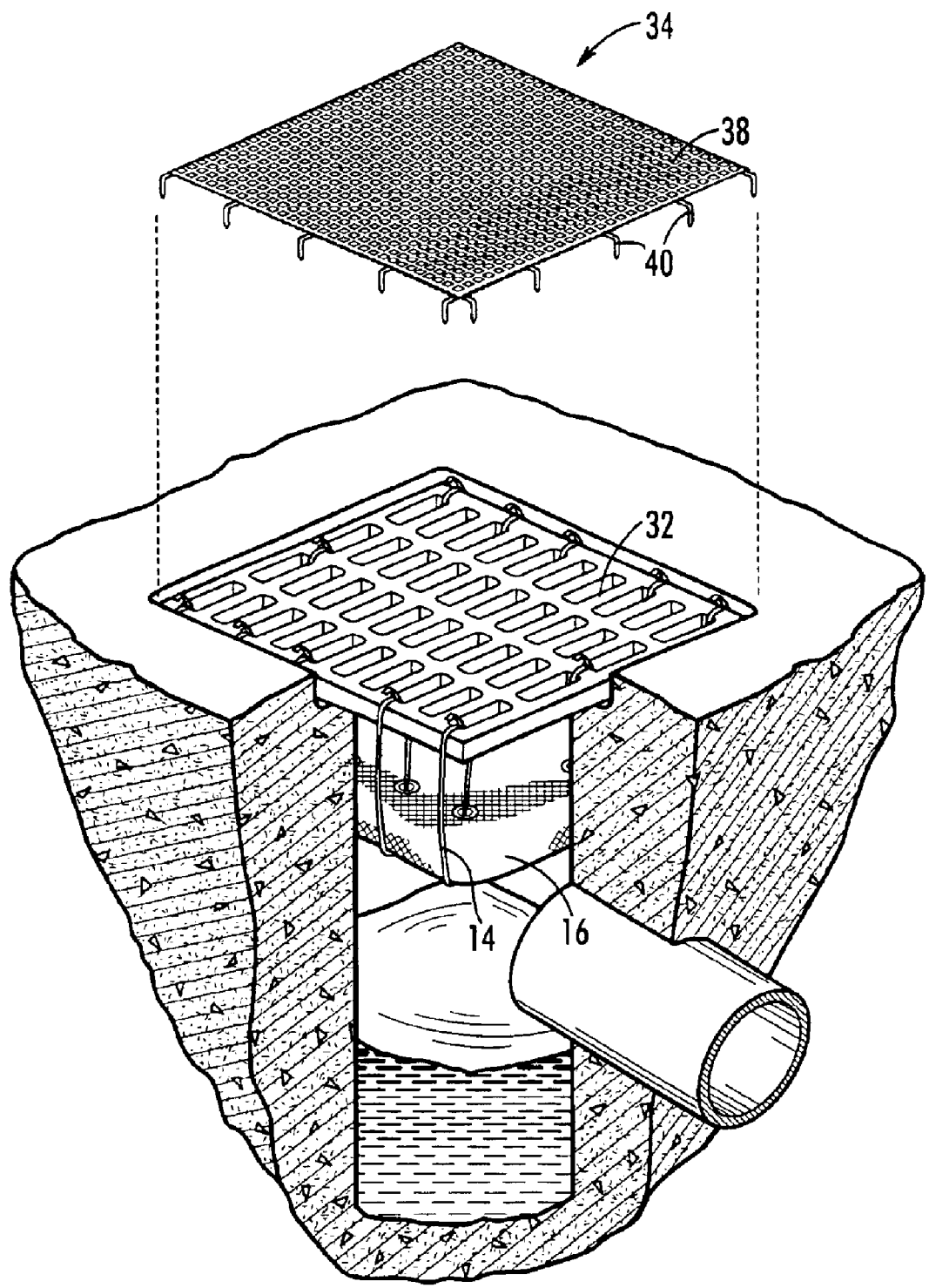
FIG. 1B is a partially exploded cut-away perspective view of a grated drain with an insert according to a preferred embodiment of the present invention.

FIGS. 1A and 1B illustrate one embodiment of the present invention, namely an insert 10 for a drain 12 along curbs and gutters. Preferably, insert 10 is dimensioned to be received with little clearance into the specific drain. This dimension allows any surface water running into inlet to flow through insert 10 rather than between it and drain 12. Insert 10 preferably includes attaching straps 14 and a mesh bag 16 that is preferably made of a loosely woven textile of natural or synthetic fibers and that contains absorber 30. Drain 12 has a grate 32 with holes that can be used by insert 10 to receive attaching straps 14. Attaching straps 14 secure and anchor mesh bag 16 to grate 32. Mesh bag 16 may also be anchored to grate 32 by alternative means of attaching such as carabiners. Preferably, mesh bag 16 includes grommets 18 dimensioned to receive attaching straps 14. Although FIGS. 1A and 1B show that mesh bag 16 is itself attached to grate 32, an alternative embodiment may include a rigid sleeve into which mesh bag 16 may be contained.

As shown in FIG. 1B, attaching straps 14 are threaded through grommets 18 and through the holes of grate 32, generally acting as a belt to fasten and anchor mesh bag 16 to grate 32. Grommets 18 are preferably located on the outer edges of absorber 30 so that attaching straps may secure mesh bag 16 in such a way as to minimize its movement during the inflow of water and thereby promote the even distribution of water pollutants throughout absorber 30. Attaching straps 14 must be sufficiently strong to hold mesh bag 16 in place, even against what might sometimes be a heavy flow of water. Therefore, attaching straps 14 are ideally made of metal such as stainless steel or galvanized steel or of a rigid plastic such as an engineering grade nylon.

Figure 2:
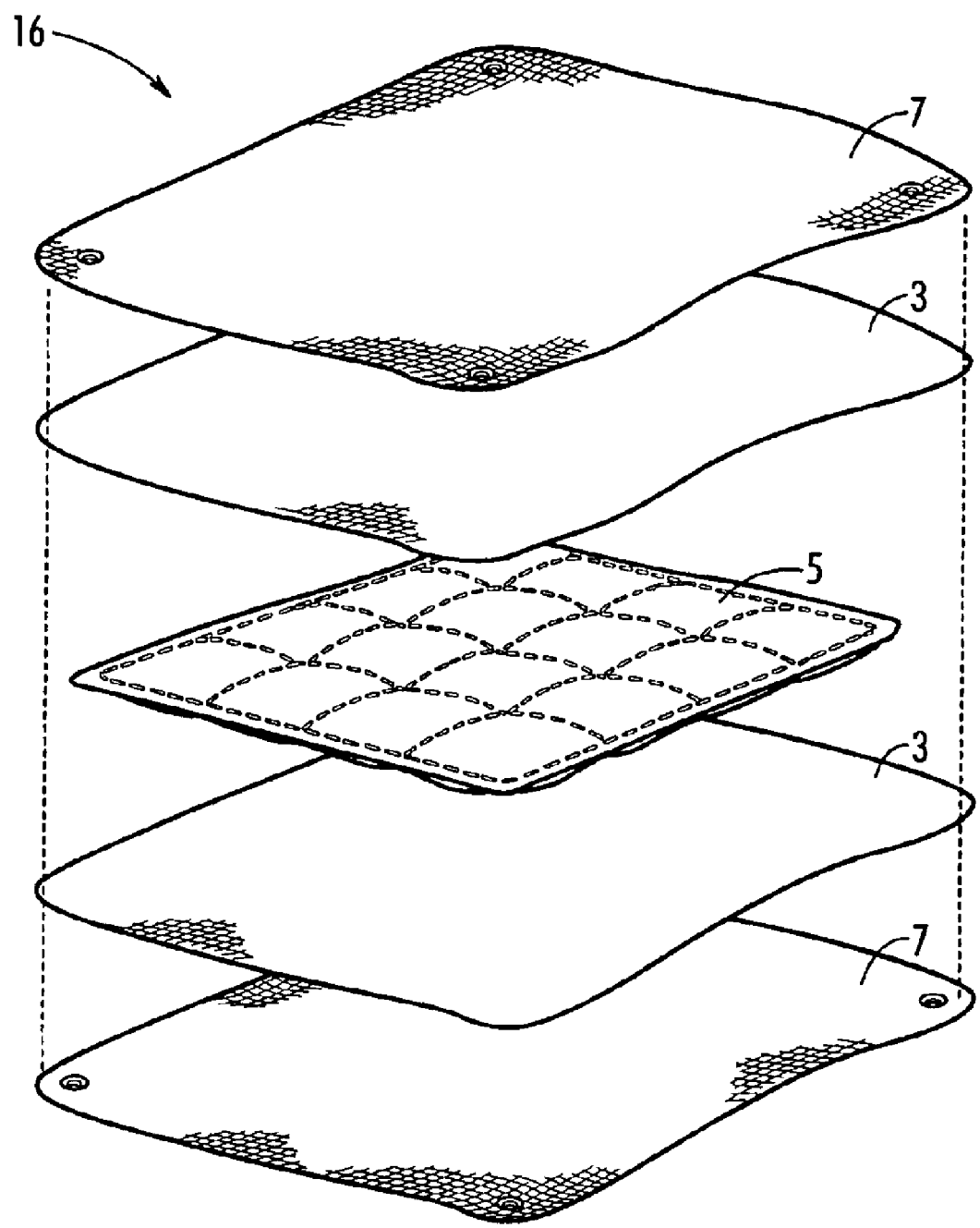
FIG. 2 is an exploded perspective view of an insert according to a preferred embodiment of the present invention.

The contents of mesh bag 16 are shown in detail in FIG. 2. As illustrated, mesh bag 16 is preferably made of layers of absorber 30 that are contained within a cover 7 of mesh fiber. Although absorber materials may vary depending on the particular contaminants that require filtering, absorber 30 is preferably a combination of a water permeable, hydrophobic oil and solvent absorber such as polypropylene, and most preferably, melt-blown polypropylene and activated carbon. Depending on the types of solvents present in the surface water, the combination of activated carbon and polypropylene may be required to more effectively filter out the pollutants. Although the polypropylene sheets effectively remove oil wastes and hydrocarbons, the activated carbon is more effective at filtering more polar wastes such as acetone. The activated carbon helps to filter a variety of organic solvents, including compounds, such as acetone, that are more polar than oils and hydrocarbons. Preferably, alternating layers of melt blown polypropylene 3 and activated carbon 5 are contained within mesh cover 7 to form mesh bag 16. As shown, activated carbon 5, which is typically in powder form, is most preferably contained within additional layers of material, such as melt blown polypropylene, that have been sewn together. This arrangement of layers of absorber 30 is a feature of the present invention. By varying the layers of absorber 30, contaminants of distinct and varying properties are more effectively filtered. For example, if the water run off includes a mixture of hydrocarbons and more polar solvents, the polar solvents may carry a portion of the hydrocarbons through the top polypropylene layers. However, by providing a layer of activated carbon beneath the polypropylene layer, the polar solvents may be filtered. Further, if the hydrocarbons that were carried by the polar solvents are not filtered at this point and continue through the activated carbon layer, the polypropylene layer beneath the activated carbon layer will filter the remaining hydrocarbons.

Mesh bag 16 may alternatively just be made of layers of melt blown polypropylene 3. In areas having mainly concentrations of oils and hydrocarbons, such as drains near gas stations, melt blown polypropylene may be all that is required to effectively filter the water run off.

Absorber 30 may alternatively be made of a combination of two or more of the following: melt-blown polypropylene, activated carbon, universal polypropylene, which is polypropylene having a surfactant sheen, and polystyrene plastic. Each of these materials contributes to both the buoyancy and filtering capacity of mesh bag 16.

As stated previously, a particular feature of the present invention is the use of absorber 30 that can be cleaned and reused, and the solvent and oil recovered. Melt blown polypropylene can be cleaned to remove solvents and oils and then reused without significant degradation. Further, the melt blown polypropylene will retain its buoyancy. Ideally, the holders for absorber 30, such as mesh bag 16, can also be reused many times even if absorber 30 is replaced periodically. When absorber 30 is cleaned, the oils and solvents may be recovered for recycle or proper disposal.

Depending on the location of drain 12, adjustments may be made to the amount of absorber 30 contained in mesh bag 16, or to the size of mesh bag 16. If drain 12 is located near sources of solvents and oils, mesh bag 16 will require larger amount of absorber. If drain 12 is also located where surface water volume peaks are relatively high, mesh bag 16 needs to be larger so that the quantity of absorber 30 is not so dense as to impede water draining and cause drain 12 to back up.

Also shown in FIGS. 1A and 1B, is a leaf trap 34 for trapping large particles such as twigs and leaves that is removably attached to the top of grate 32. Leaf trap 34 preferably includes a coarse mesh grid 38 that is dimensioned to cover grate 32 and to catch and hold leaves and twigs but allow water to pass readily. Leaf trap 34 further includes pliable strips 40 that extend out beyond mesh grid 38 and that can be used to grip leaf trap 34 to outer edges of grate 32. In servicing insert 10, leaf trap 34 would be cleaned frequently, such as every few weeks or more often in fall and after heavy downpours.

Figure 3:
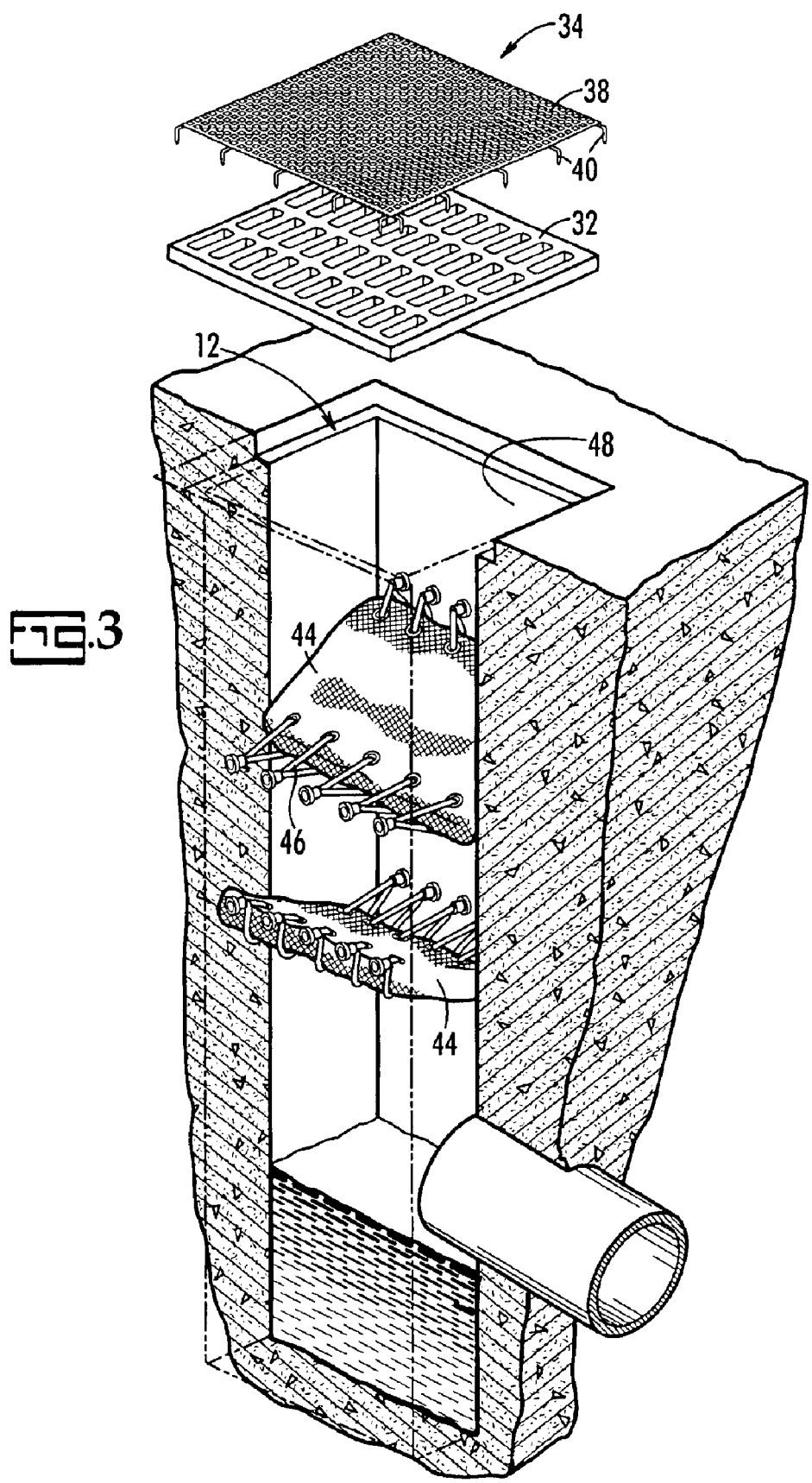
FIG. 3 is an exploded cut-away perspective view of a grated drain with an insert according to a preferred embodiment of the present invention.

FIG. 3 illustrates an alternative embodiment of the present invention, which is also an insert 10 that fits into a drain 12. Insert 10 includes plural baffles 44 containing absorber 30 and attaching braces 46 that secure plural baffles 44 to inner wall 48 of drain 12. Below grate 32 of drain 12, plural baffles 44 are set at angles so as to direct surface water that does not flow through one baffle 44 to the next baffle 44. Each baffle 44 is shaped to fit drain 12. Each baffle 44 is mounted so that it is cantilevered from 48 of drain 12 and is sloped downward toward the top of the next baffle 44. Baffles 44 are made of a loosely woven textile of natural or synthetic fibers and filled with absorber 16. As shown, braces 46 of baffles 44 are preferably welded or bolted to wall 48 of drain 12 so that baffles 44 are held firmly in place. Alternatively, baffles 44 may be secured to a rigid insert sleeve that may itself be bolted or welded to wall 48 of drain 12. Structural support in the form of bracing as appropriate for the load can be supplied. Baffles 44 may be one inch to ten inches thick, but three inches is preferred.

Preferably, insert 10 also includes a leaf trap 34 that is removably attached to the top of drain grate 32. Similar to leaf trap 34 shown in FIGS. 1A and 1B, leaf trap 34 of FIG. 2 includes a coarse mesh grid 38 dimensioned to fit over grate 32 and to catch and hold leaves and twigs but allow water to pass readily. Preferably, mesh grid 38 includes pliable strips 40 that extend out beyond mesh grid 38 that can be used to grip leaf trap 34 to outer edges of grate 32.

Figure 4:
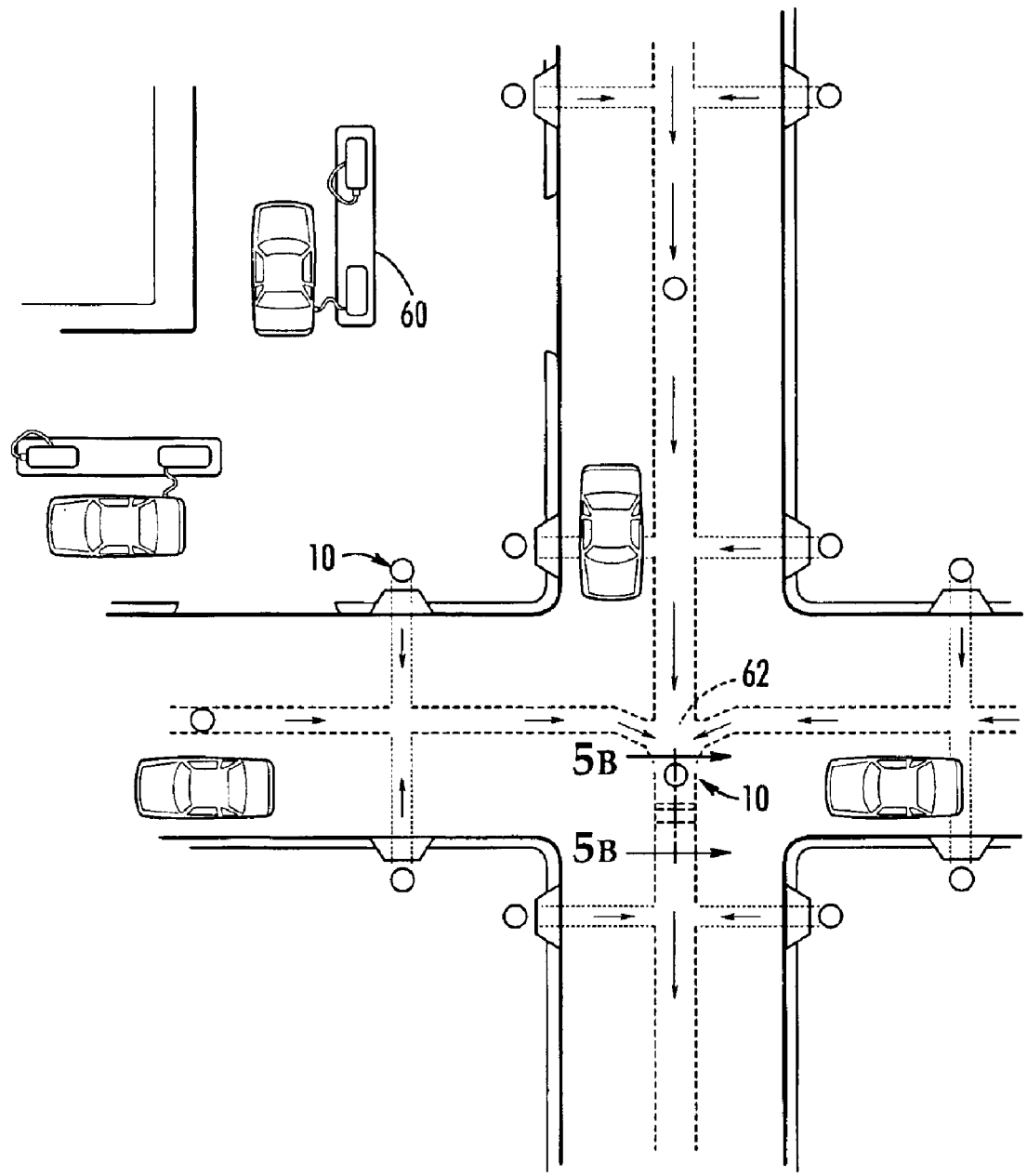
FIG. 4 is a top view of a city infrastructure including outflow pipes with inserts according to a preferred embodiment of the present invention.
Figure 5A:
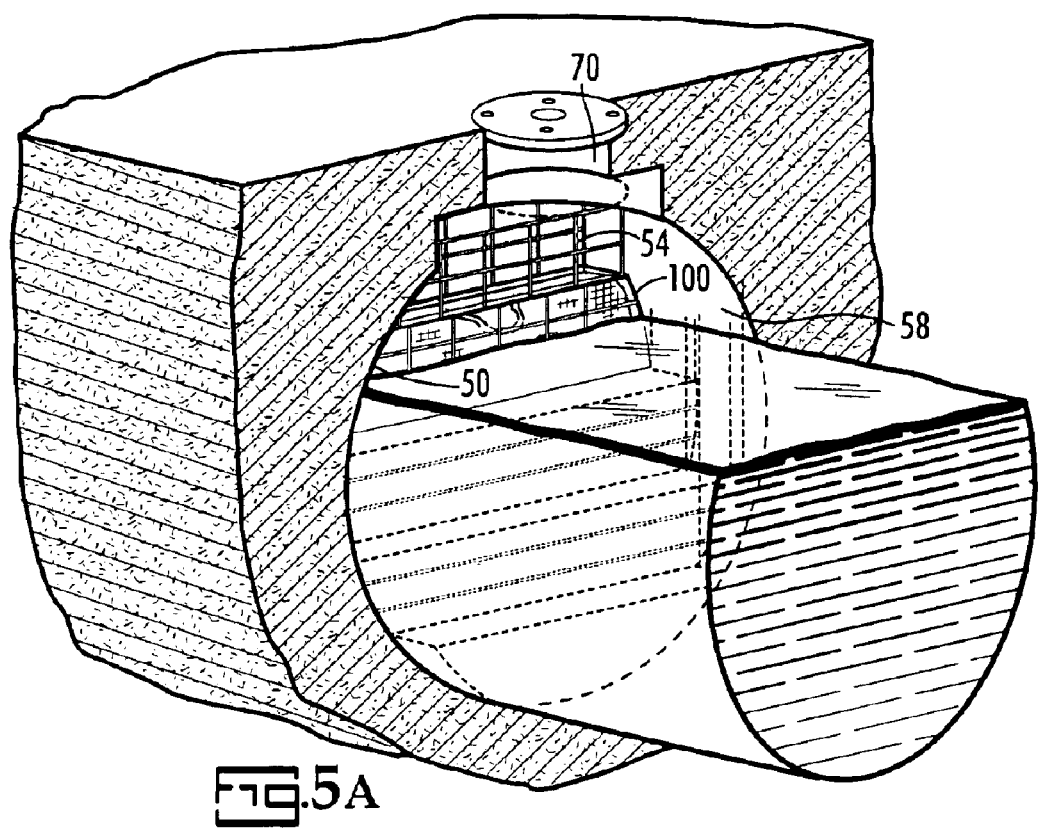
FIG. 5A is a cross-sectional perspective view of an outflow pipe with an insert according to a preferred embodiment of the present invention.
Figure 5B:
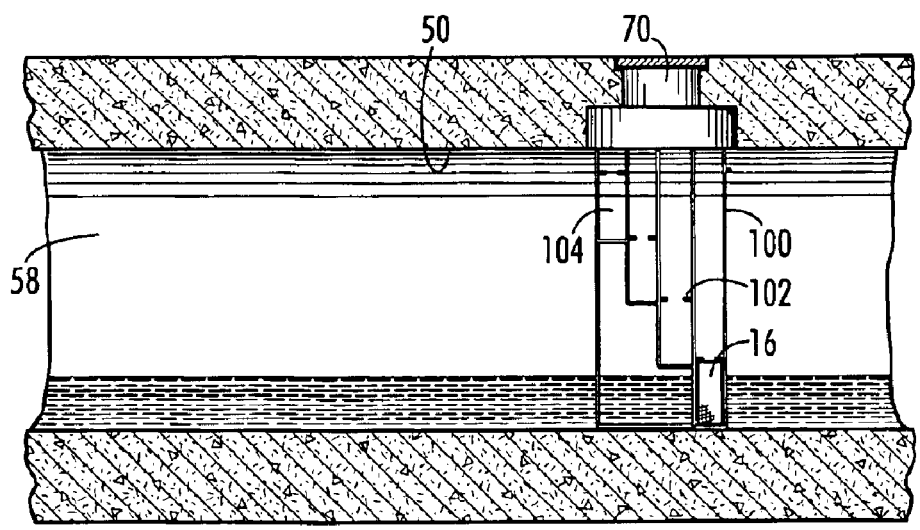
FIG. 5B is a cross-sectional side view of an outflow pipe with an insert according to a preferred embodiment of the present invention.

An alternative embodiment of the present invention is shown in FIGS. 4–5B. FIG. 4 shows insert 10 of FIGS. 5A and 5B in use within a typical city infrastructure. As shown, insert 10 may be strategically placed along pipes 50 so as to maximize their effectiveness to control and abate pollution. For example, inserts 10 may be placed along pipes in close proximity to gas stations 60 to more effectively reduce the amounts of petroleum and oil that may be concentrated in these areas. Furthermore, inserts 10 may be placed at pipe junctures 62 which will more than likely contain higher concentrations of pollutants. Inserts 10 may also be placed near the pipe opening into a river, a lake or a reservoir. Preferably, insert 10 is placed near an inlet 70 to a pipe system, such as a manhole, to allow for convenient maintenance of insert 10. Insert 10 is dimensioned to fit within pipe 50 and may be secured to pipe 50 using means for holding 56 such as hooks embedded in wall 58 of pipe 50. Depending on the size of pipes 50, size of insert 10 and the container for absorber 30 used may be adjusted accordingly.

As illustrated, insert 10 includes a frame 100 surrounding and holding mesh bags 16 containing absorber 30. Mesh bags 16 are divided into multiple chambers 104 formed by coarse mesh screens 54. As shown, insert 10 holds mesh bags 16 in place by flanges 102 that are located on mesh screens 54. Flanges 102 are made of a flexible material such as rubber that will bend to allow mesh bags 16 of varying sizes to be inserted and held in place. Mesh bags 16 may be both inserted and released from frame using rod-like tools having means for gripping bags, such as hooks. Chambers 104 of frame 100 of insert 10 are tiered so that each mesh bag 16 sits above or below the neighboring mesh bag 16. This tiered configuration is preferable because mesh bags 16 can be placed at optimal elevations depending on the water level. For example, in FIG. 4A, the water level is high; therefore, the most effective placement of mesh bag 16 would be in elevated chamber 104. However, if the water level were low, as in FIG. 4B, the most effective placement of mesh bag 16 would be in a lower chamber 104.

Figure 6A:
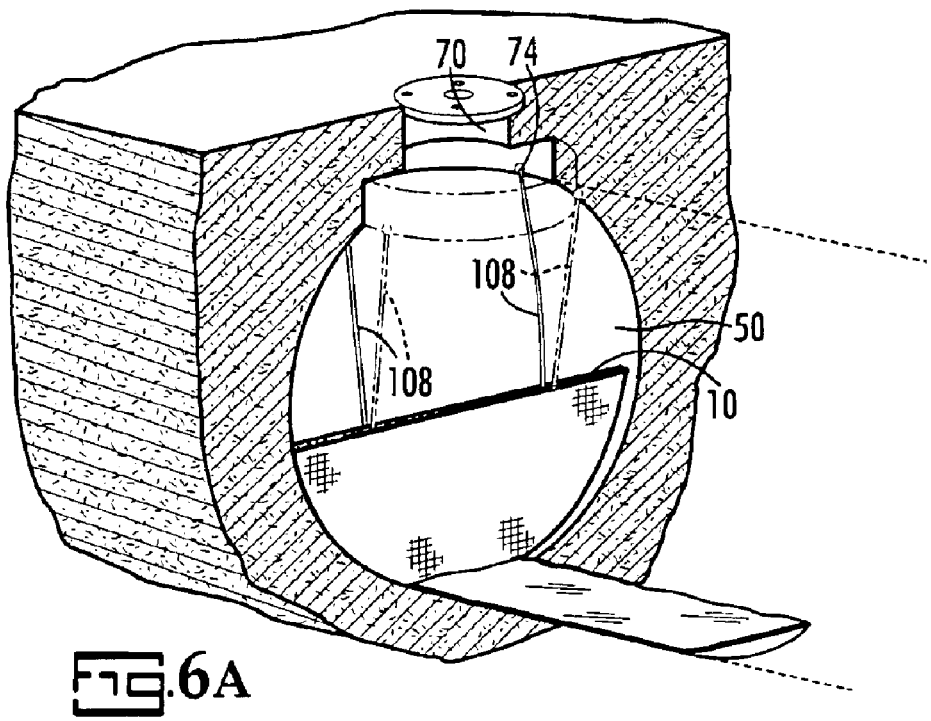
FIG. 6A is a cross-sectional perspective view of an outflow pipe having low flow with an insert according to a preferred embodiment of the present invention.
Figure 6B:
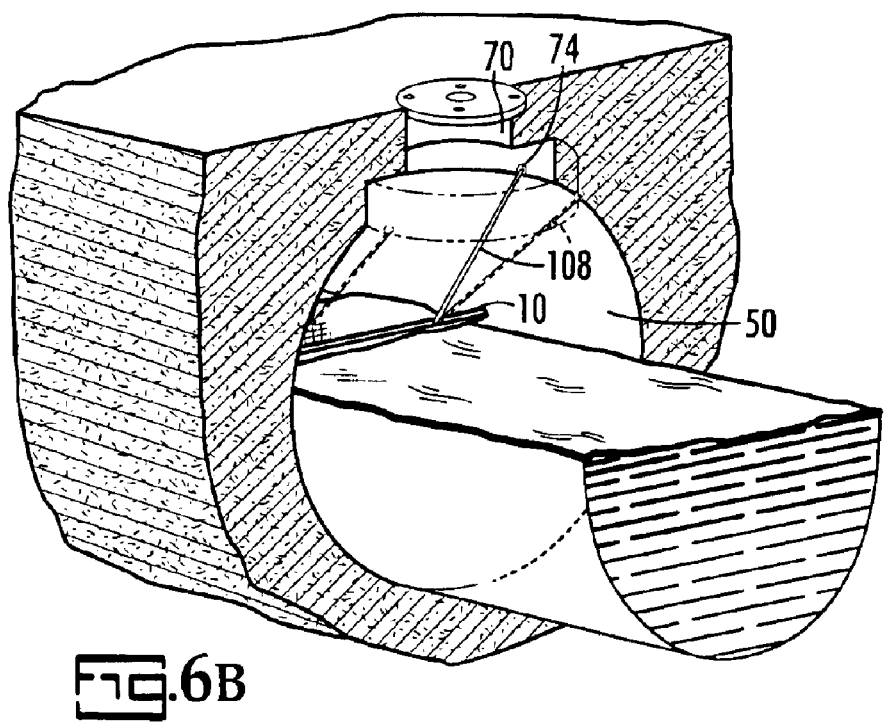
FIG. 6B is a cross-sectional perspective view of an outflow pipe having high flow with an insert according to a preferred embodiment of the present invention.

FIGS. 6A and 6B illustrate yet another embodiment of insert 10 according to the present invention. In an inlet to a sewer system, namely, a manhole 70 that is located above a pipe 50 from which surface water that has been collected is permitted to enter a river, a lake or a reservoir, is fitted with insert 10 that is dimensioned to fit inside pipe 50 and is attached to the interior walls of manhole 70 by a means for attaching 106, such as a hook. As shown, insert 10 resembles a pendulum, wherein insert 10 is suspended from a fixed support and swings freely back and forth under the influence of gravity and the flow of the surface water. Preferably, insert 10 is suspended from multiple supports 74 along the interior wall of manhole 70 by means for suspending 108 such as a cable. Preferably, suspending means 108 anchors insert 10 to the interior wall of manhole. Insert 10 is removably attached to supports 74 means for attaching, such as hooks; therefore, insert 10 may be replaced if insert 10 becomes saturated with pollutants.

Typically, the pollutants in the surface water are concentrated near the top of the water level. Ideally, insert 10 remains on or near the top of the water level as the flow rate of the surface water increases or decreases so as to most effectively filter the surface water pollutants. As shown in FIG. 6B, insert 10 swings in the direction of the surface water flow and rests on the top of the water level. Regardless of how high the water level becomes, insert 10 will continue to swing in the direction of the water flow and rest on the top of the water where most of the pollutants are concentrated.

Preferably, insert 10 is made of sheets of melt-blown polypropylene that have been bound together. In order to optimize the filtering of pollutants present in the surface water, insert 10 should be of a weight that allows insert 10 to freely swing and rest on or near the top of the water level. Along the bottom edge of insert 10 may also be included a tear resistant material, such as a hard plastic, that prevents the melt blown polypropylene from becoming tethered as it swings back and forth along the interior walls of pipe 50 below manhole 70. Although the exact number and dimension of sheets required to serve as a pendulum filter within a sewer system may require experimentation by those skilled in the art, ideally, 3–5 sheets are bound together. Further, these sheets are dimensioned so as to just fit within the bottom of pipe 50.

Alternatively, insert 10 is a combination of melt-blown polypropylene and activated carbon. Depending on the types of solvents present in the surface water, the combination of activated carbon and polypropylene may be required to more effectively filter out the pollutants. Specifically, the activated carbon would be contained between bound sheets of polypropylene.

A preferred embodiment of the present invention was tested on a sample mixture. The sample was made of 32 ounces of liquid. Specifically, the sample included 24 ounces of water and 8 ounces of motor oil, which corresponds to a 3:1 ratio of water to oil. In the test, mesh bag 16 containing absorber 30 was placed beneath sample and over a catch basin. Thereafter, the sample was filtered through mesh bag 16 by pouring it onto mesh bag 16 and into the catch basin. The filtered mixture was then analyzed by a gas chromatograph for the presence of oil and water. The filtered mixture contained 99.9975% water and 0.0025% oil. This result shows the effectiveness of melt blown polypropylene to filter oil from oil and water mixtures.

Finally, Those skilled in surface water management will recognize that many substitutions and modifications can be made in the foregoing preferred embodiments without departing from the spirit and scope of the present invention.

What is claimed is:

1. A device for use in a sewer system, said sewer system including a grated drain, comprising:
    an absorber;
    a holder containing said absorber; and
    means for attaching said holder to a grate of a grated drain, said grate having openings, said holder being a mesh bag including plural grommets for receiving said attaching means, wherein said attaching means is threaded through said plural grommets and through said openings to fasten said mesh bag to said grate.

2. The device as recited in claim 1, wherein said absorber is melt blown polypropylene.

3. The device as recited in claim 1, wherein said absorber is made of a combination of melt blown polypropylene and activated carbon.

4. The device as recited in claim 1, wherein said absorber is selected from one or more of the following materials: melt blown polypropylene, activated carbon, universal polypropylene, and polystyrene plastic.

5. The device as recited in claim 1, further comprising a trap for catching large particles that is removably attached to the top of said grated drain.

* * * * *